United States Patent [19]

Gorlov

[11] Patent Number: 5,222,833
[45] Date of Patent: Jun. 29, 1993

[54] SHUTTER FOR HYDRO-PNEUMATIC CURRENT FLOW HARNESSING SYSTEM

[75] Inventor: Alexander M. Gorlov, Brookline, Mass.

[73] Assignee: Northeastern University, Boston, Mass.

[21] Appl. No.: 808,684

[22] Filed: Dec. 17, 1991

Related U.S. Application Data

[63] Continuation-in-part of Ser. No. 697,209, May 8, 1991, Pat. No. 5,074,710.

[51] Int. Cl.$^5$ ............... E02B 9/00; E02B 9/08; F03B 13/12
[52] U.S. Cl. ............... 405/76; 60/370; 60/398; 290/53; 290/54
[58] Field of Search ............... 405/75-78, 405/80, 87-90, 92-95, 99, 100; 60/370, 398; 290/42, 43, 52-54; 417/330, 334

[56] References Cited

U.S. PATENT DOCUMENTS

| | | | |
|---|---|---|---|
| 256,580 | 4/1882 | Hemingway | 405/94 |
| 616,486 | 12/1898 | McGowan | 405/73 X |
| 1,986,113 | 1/1935 | Lun | 405/94 |
| 2,715,366 | 8/1955 | Vartiainen | 405/76 X |
| 4,095,423 | 6/1978 | Gorlov | 60/398 |
| 4,103,490 | 8/1978 | Gorlov | 60/398 |
| 4,152,895 | 5/1979 | Wirt | 60/398 |
| 4,206,601 | 6/1980 | Eberle | 60/398 |
| 4,211,077 | 7/1980 | Cassidy | 60/398 |
| 4,251,991 | 2/1981 | Wood | 60/398 |
| 4,265,599 | 5/1981 | Morton | 417/54 |
| 4,309,152 | 1/1982 | Hagen | 417/218 |
| 4,408,454 | 10/1983 | Hagen et al. | 60/500 |
| 4,441,030 | 4/1984 | Bellamy | 290/53 |
| 4,448,020 | 5/1984 | Wood et al. | 60/398 |
| 4,464,080 | 8/1984 | Gorlov | 405/76 |
| 4,675,536 | 6/1987 | Bellamy | 290/42 |
| 4,781,023 | 11/1988 | Gordon | 60/506 |
| 4,782,663 | 11/1988 | Bellamy | 60/398 |

FOREIGN PATENT DOCUMENTS

| | | | |
|---|---|---|---|
| 873528 | 4/1953 | Fed. Rep. of Germany | 405/100 |
| 1119177 | 12/1961 | Fed. Rep. of Germany | 425/100 |
| 1145559 | 3/1963 | Fed. Rep. of Germany | 405/100 |
| 411290 | 7/1945 | Italy | 405/100 |
| 215907 | 10/1985 | Japan | 405/76 |
| 282510 | 12/1986 | Japan | 405/100 |
| 253432 | 6/1926 | United Kingdom | 405/100 |

OTHER PUBLICATIONS

*A Novel Approach to the Explotation of Tidal Energy* Report to the U.S. Department of Energy, V1-Summary and Discussions, Dec., 1981, Gorlov, Alexander M.
"*The Wells Turbine*" (promotional information) Hydro Energy Associates Limited, Glos. GL50 3DA, and, Coventry Lanchester Polytechnic, Energy Systems Group, Coventry CV1 5FB, England.

Primary Examiner—Dennis L. Taylor
Assistant Examiner—John Ricci
Attorney, Agent, or Firm—Weingarten, Schurgin, Gagnebin & Hayes

[57] ABSTRACT

A gravitational window shutter in a water gate for a system for harnessing power from current flow or tidal movement in a of water is disclosed. The gate is formed with a door for closing the port through which the water may flow. The door has a window in an upper portion thereof which is closed by a rotatable shutter. The shutter opens before the door, allowing a flow of water through the window, which reduces the drag on the door. The door is then able to open more rapidly. A gravitational closure causes the shutter and door to close. The gravitational closure is formed by a counter weight on the shutter. An improved configuration of the chambers is also disclosed. The chambers have an upper portion of a rectangular configuration with a larger volume to increase the volume of air flowing through the system and a lower portion of a cylindrical configuration to reduce the hydraulic losses due to vortices during water inflow and outflow.

41 Claims, 12 Drawing Sheets

5,222,833

SHUTTER FOR HYDRO-PNEUMATIC CURRENT FLOW HARNESSING SYSTEM

RELATED APPLICATION

This application is a continuation-in-part of U.S. patent application Ser. No. 07/697,209, filed on May 8, 1991, entitled Water Gate Array for Current Flow or Tidal Movement Pneumatic Harnessing System, now U.S. Pat. No. 5,074,710.

FIELD OF THE INVENTION

The invention relates to systems for deriving useful power from current flow or tidal motion in water bodies, and in particular to a water gate for use in such systems.

BACKGROUND OF THE INVENTION

Systems for utilizing tidal motion and current flow of oceans and rivers are known. Such systems usually require a dam or other physical structure which separates one part of a water body from another part. A difference in water levels is thereby created which provides a pressure differential useful for driving mechanical devices such as hydroturbine generators.

Conventional hydroturbine technology, involving the necessity of positioning a powerhouse in a dam body with turbines located below the lowest water surface, has been applied at mountain river and waterfall sites where a large water head can be developed. However, the hydroenergy potential of thousands of plain rivers and river canals remain untapped because hydroturbines, as an economical and practical matter, do not operate effectively with a low water head, in other words, when water level differences are about three meters or less. Hydroturbines need significant water depth for installation and cost-efficient operation. Consequently, powerhouses which contain the hydroturbines must be installed in large and complicated dam structures capable of withstanding the enormous water pressures generated.

Systems for harnessing the energy in ultra low water heads (less than three meters) and in smaller scale systems employing pneumatic turbines and devices are also known. In U.S. Pat. No. 4,103,490, issued to the same inventor as herein, a single tidal chamber is utilized in which a housing is mounted on the ocean bed with ports of ingress and egress near the bottom or lower part of the housing, through which tidal waters may flow. Positive air pressure is built up in the housing by rising tides, and partial vacuums are created by falling tides. The positive air pressure or partial vacuum at the top of the housing is connected through auxiliary high pressure and low pressure chambers to a two-state revolving valve having two input ports and two output ports.

In U.S. Pat. No. 4,095,423, also issued to the same inventor, a similar system is described in which a dam structure is used, but an air valve rather than a water valve is employed.

In U.S. Pat. No. 4,464,080, also issued to the same inventor as herein, an apparatus is described for utilizing power generated by rising and falling tides or by flowing currents. A single cavity chamber contains a high volume gating system in which water is cyclically gated from the high water level on one side of a dam, through the single cavity chamber, to the lower water level on the other side of the dam, alternately providing positive air pressure and a partial vacuum within the single chamber. Air pressure variations are used for driving an air motor. In one embodiment, the chamber comprises a barrier at the chamber bottom which divides the bottom of the chamber in half, large ports on either side of the barrier to permit alternative inflow and outflow of high volumes of water, and mechanically operated sets of sluice gates for selectively opening and sealing different sets of ports. Also disclosed are vertical sluice gates that are automatically activated by their own weight and water pressure.

The present application represents a patentable development of the concept of using an air engine to harness hydropower. This concept was formulated by the Applicant in U.S. Pat. Nos. 4,095,423; 4,103,490; and 4,464,080 described above.

A double-box system has been devised at the Coventry Polytechnic Institute, England, which is comprised of a butterfly-or figure-eight-shaped pair of hydro-pneumatic chambers which are connected together by a diverting vertical valve. Upstream water flows against one side of the figure "8" and is diverted into one of the chambers, while water in the other chamber is allowed to flow into downstream water on the other side. The valve is a vane which pivots on a vertical axis to control the water input and output of the two chambers. Switching the valve causes the chambers to fill and empty alternatively which drives air through a turbine coupled to an electric generator to produce electric power. However, the mechanical complexity of the valve and drive system gives rise to reliability problems. Even if automatic switching mechanisms can be adapted to the vertically-pivoting diverting gate, the use of such a gate does not permit high volumes of water to be processed because the large gates required for processing large volumes of water have greater inertia and water resistance, thereby increasing cycle times. Because a single vertical gate is used for both chambers, unavoidable loss of water and potential energy arises due to direct leakage of the water flow out of both chambers when the gate is in an intermediate position. These characteristics disfavor application of such a gate design to a harnessing system intended for use with low water heads.

SUMMARY OF THE INVENTION

The invention provides an apparatus for harnessing energy from current flow or tidal movement in water bodies, including those affording small water heads such as rivulets and creeks. An exemplary apparatus comprises four vertical walls connected together about a common vertical axis to form a general X-shape. One pair of opposed quadrants defined thereby are enclosed to form chambers. The other pair of opposed quadrants confront and separate water bodies as a barrier or as part of a barrier between a higher water level and a lower water level, such as between upstream water and downstream water. Each wall contains a sealable underwater port to permit water to flow into and out of the chambers. In each port, a water gate or array of louvers is rotatable with respect to a horizontal axis between two positions and operable to permit sealing of the port or flowing of water through the port. Gates of diagonally opposite walls are coupled through the orthogonal walls by a common shaft. Cross-coupled gates are thereby provided for the synchronized, but alternating, filling and emptying of the two chambers. When a first cross-coupled set of gates is open, the second cross-coupled set of gates is closed; thus, upstream water enters a first chamber while water in the second chamber exits into downstream water. When water levels in each chamber are the same as respective levels of the upstream water and downstream water to which they are connected, the first set of gates is closed by a counterweight on the coupling shaft and the second set of gates is urged to an open position by water pressure. Upstream water begins entering the second chamber while water in the first chamber exits into downstream water. When water levels in the chambers are the same as respective levels of the upstream or downstream water to which they are connected, the second set of gates is urged to a closed position by a counterweight on the coupling shaft and the first set of gates is reopened. The cycle is then repeated.

As sets of cross-coupled gates open and close in alternation, the air pressure and the partial vacuum which successively build up in see-saw fashion between the chambers fluctuates rapidly. The chambers are connected to each other by a pipe or channel through which an air jet moves. This quick air pressure movement, doubled by the chamber-to-chamber action, drives an air turbine combined with an electric generator. In a further embodiment, each gate comprises a synchronized plurality of small louvers connected in a jalousie arrangement which avoids the cumbersome inertia of large doors and permits large volumes of water to pass through the system.

A further embodiment of a water gate is provided which may be used with the two-chambered system disclosed herein or with any other suitable water power harnessing system. The water gate comprises a rotatable door having a window therein, the window closable by a rotatable shutter. The shutter opens prior to the door, providing for a reduced drag force on the door, thereby enabling the door to open more rapidly. A gravitational closure is provided on the shutter for closing the shutter and the door. The invention provides efficient energy conversion where the water head is extremely low and the natural flow of the water course is intended to be left undisrupted.

A more optimal configuration of the chambers is also provided. In this configuration, the chambers have a cylindrical lower portion and a rectangular upper portion. The upper portion provides a larger volume to accommodate a larger volume of air flowing through the system. The lower portion is cylindrical to reduce hydraulic losses due to vortices formed during water inflow and outflow. Further features and advantages of the invention are discussed hereinafter.

DESCRIPTION OF THE DRAWINGS

The invention will be more fully understood from the following detailed description taken in conjunction with the accompanying drawings in which.

DETAILED DESCRIPTION OF THE INVENTION

Figure 1:
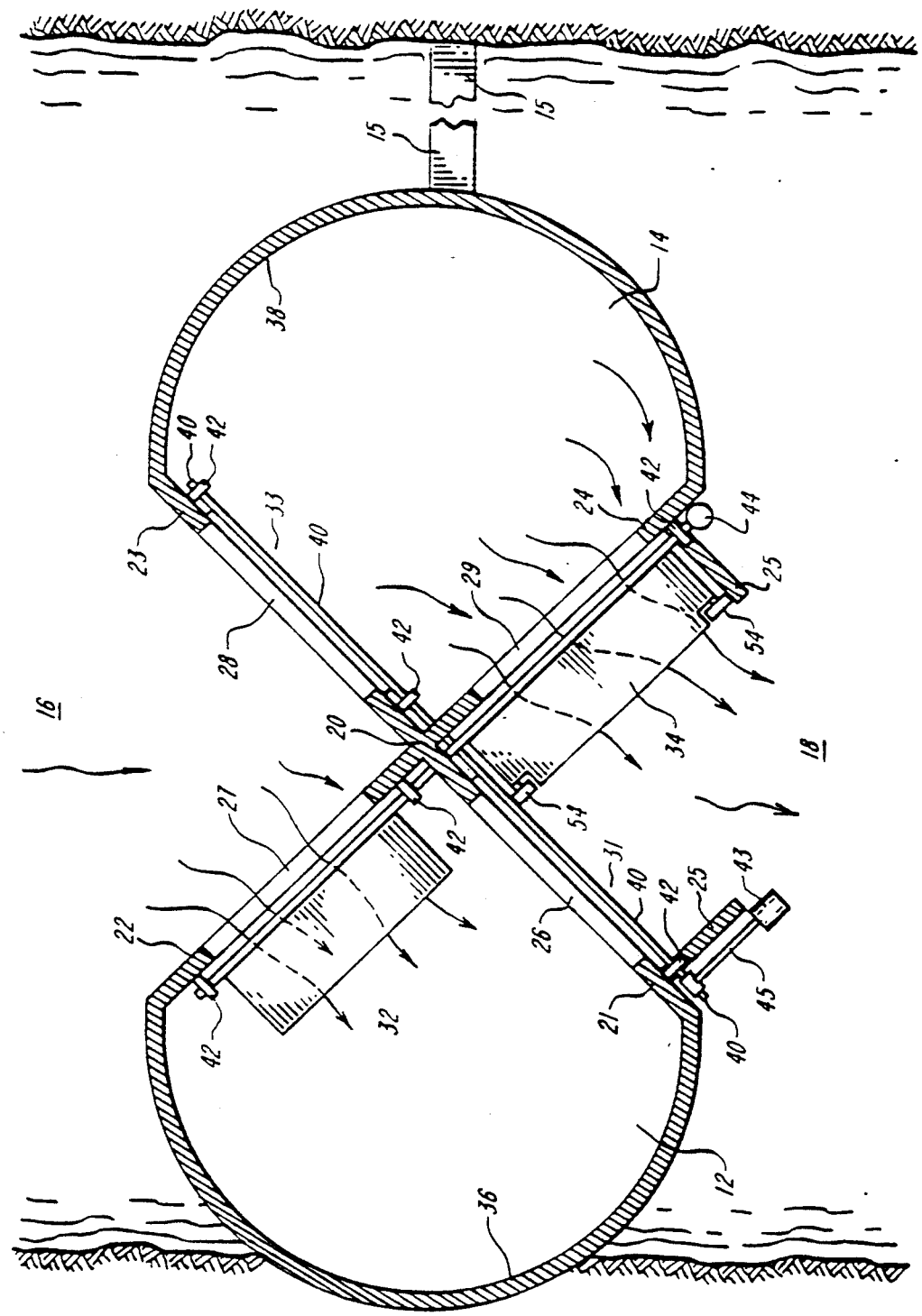
FIG. 1 is a top diagrammatic view of the hydro-pneumatic chambers with cross-coupled water gates in an exemplary embodiment of the invention.

As shown by the exemplary embodiments in the drawings, the invention provides a current flow or tidal motion harnessing system that can be used in oceans, lakes, rivers, creeks, and in any other body of water in which a pressure differential can be created by separating a higher level of water from a lower level of water, a water level differential known as a "water head." The invention has applications in large bodies of water, such as oceans, and may be used in conjunction with an elongated flexible barrier to create separations of water during tidal movements. It is especially useful in small rivers, rivulets, or creeks having ultra low water heads, because the scale of the apparatus design does not adversely affect the efficiency of the design. Moreover, the ability of the system to pass large volumes of water without requiring a large water head is environmentally advantageous because it avoids the need to build a large upstream water reservoir. In this manner, land area is protected against substantial flooding. Furthermore, damage to fish and other animals is decreased in the absence of water turbines and the dam body.

FIG. 1 shows a top diagrammatic view of an exemplary embodiment of the water gate system of the invention situated in a body of water, such as a river, which has been separated into a higher water level 16 and lower water level 18. The physical structure of the system 10, comprised of a housing for a first hydro-pneumatic chamber 12 connected to a housing for a second hydro-pneumatic chamber 14, may itself be used as a barrier to create the water level differential 16/18, or used in conjunction with a separate barrier 15. The housings of the chambers 12 and 14 are defined in part and separated by a first vertical wall 21, a second vertical wall 22, a third vertical wall 23, and a fourth vertical wall 24 connected together about or around a vertical axis 20. Each of these vertical walls 21, 22, 23, and 24 contains, respectively, water ports 26, 27, 28, and 29 located beneath the lowest water level to permit water to flow through the walls. The system further comprises water gates 31-34 which are rotatable, with respect to a horizontal axis, on shafts, pivots, or hinges between open and closed positions and operative to allow water to flow through respective ports 26-29 or to seal them against water flow. A plastic or rubber seal, such as the kind used for refrigerator doors, may be used to provide further sealing between the port openings and water gates.

Preferably, the water ports 26-29 should be located near the bottom of the chambers 12 and 14 and as close to the floor or bed of the river, ocean, or waterway as possible. This will allow the system to be used even when the overall surface level of the water is relatively low.

Figure 2:
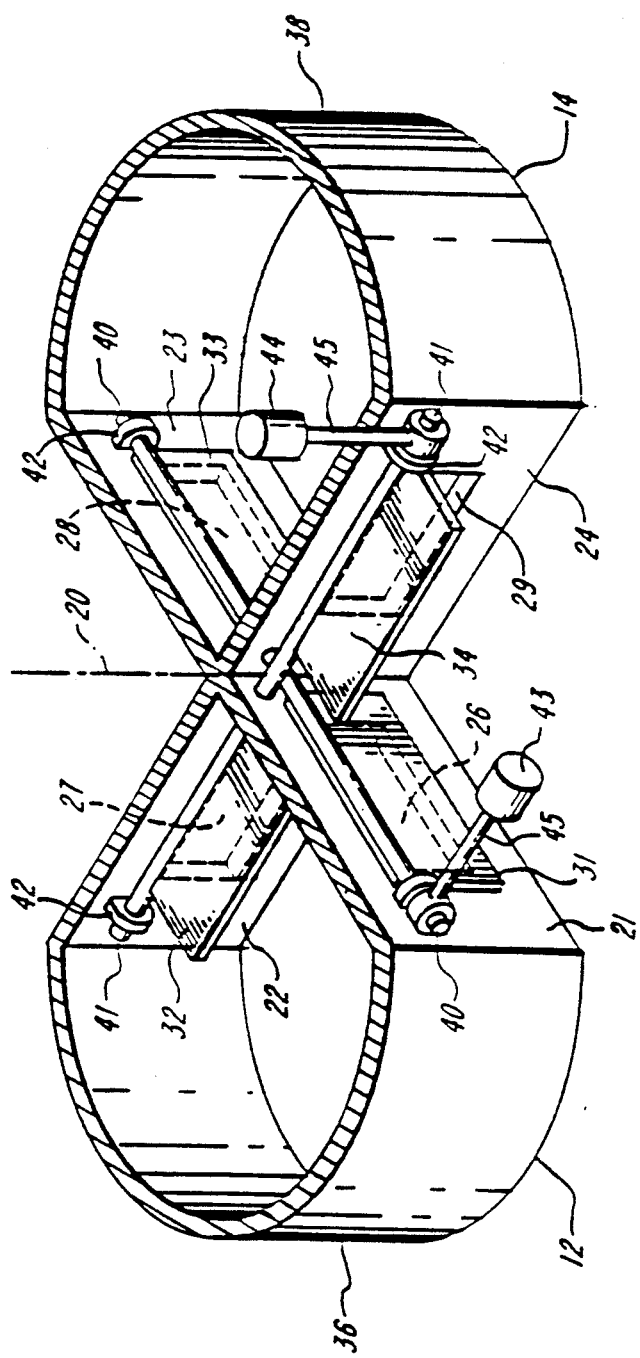
FIG. 2 is a cut-away perspective view showing the bottom of the chambers and gates of FIG. 1.
Figure 3:
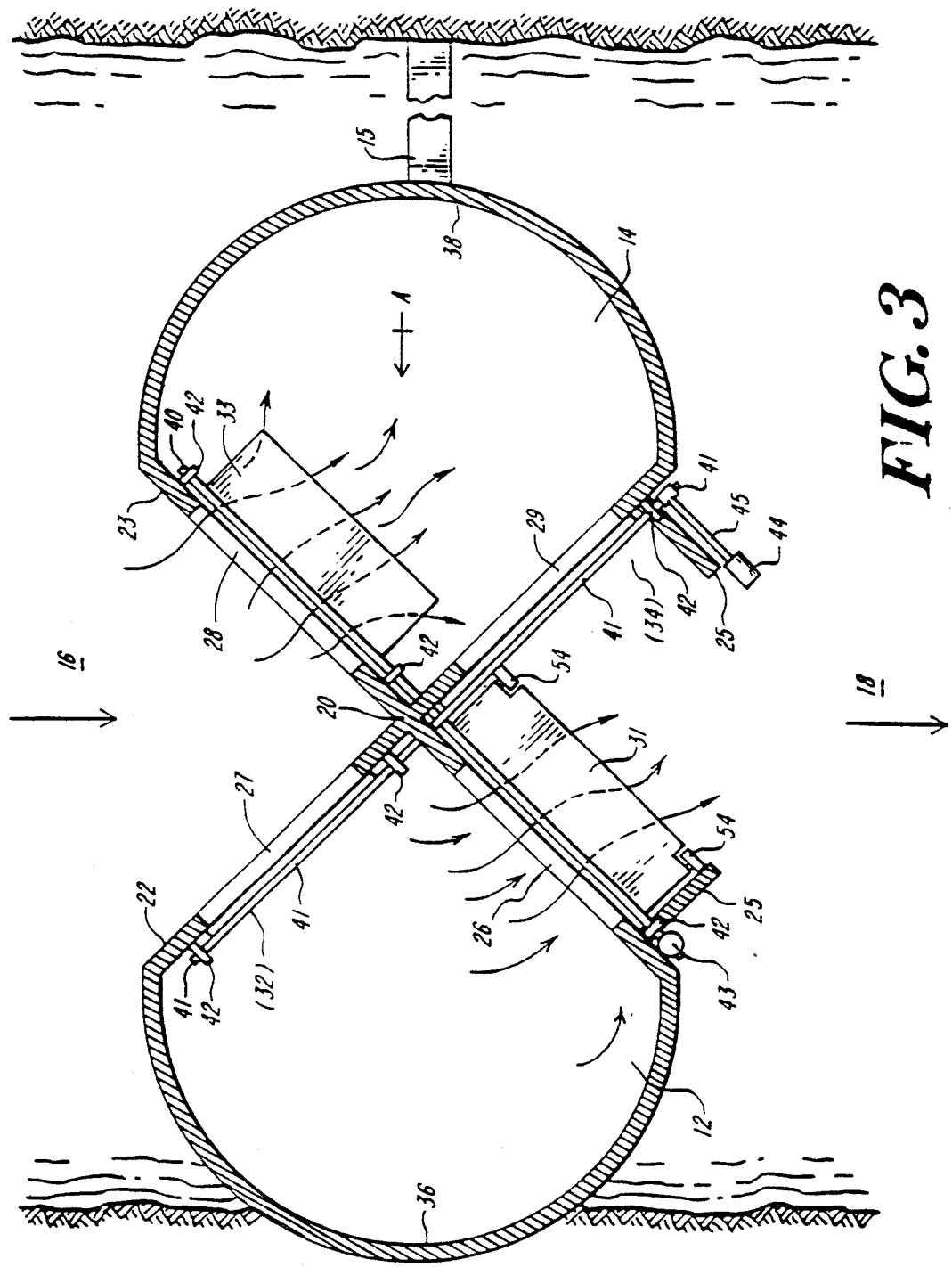
FIG. 3 is a top diagrammatic view of the chambers and gates of FIG. 1 in a second phase of operation.

As shown in FIGS. 1 and 3, wheels or rollers 54 are mounted to the outer lower edges of water gates 31 and 34. These wheels 54 permit an opening water gate 34/31 to prevent the closed gate 31/34 from opening. Also shown in FIGS. 1 and 3 are vertical members 25, shown from the top, which are connected to each of the vertical walls 21 and 24. These vertical members 25 provide structural resistance to relieve pressure exerted by a closed gate 31/34 on an open gate 34/31. In FIG. 1, for example, water pressure in the first hydro-pneumatic chamber 12 exerts pressure on the water gate 31 (shown in closed position) which in turn exerts pressure upon the roller 54, water gate 34, and roller 54, which in turn exert pressure on the vertical member 25. The vertical members 25 are shown housing water-proof bearings 42 through which the shafts 40/41 are rotatably mounted. For convenience of explanation, the vertical members 25 disposed on walls 21 and 24 are not illustrated in FIGS. 2 and 4.

FIG. 2 shows a partial perspective view of the portion of the hydro-pneumatic chamber housings 12 and 14 that is located beneath the water surface. The ports are preferably rectangular in shape and of a uniform size to ensure an equal rate of water flow through the system. The housing of the first chamber 12 is defined by vertical walls 21 and 22 and wall 36, which may be either flat or curved as shown, or the wall 36 may assume any other suitable shape. Similarly, the housing of the second chamber 14 is defined by vertical walls 23 and 24 and wall 38, which may be flat or curved as shown. For example, chambers 12 and 14 may each have five sides. The four vertical walls 21-24 may be manufactured together as a unit, then further external walls of various sizes and shapes may be added in accordance with the chamber volume desired. A ceiling portion 39 (shown in FIGS. 4-6) connects to the vertical walls and curved walls 36/38 to enclose the air space above the water surface in each of the hydro-pneumatic chambers 12 and 14.

The material of the vertical walls 21-24, the external walls 36 and 38, and the ceiling surfaces 36 and 38 may comprise any material such as metal, plastic, concrete, wood, or fiber board which is treated, if necessary, to prevent corrosion or other deleterious effects of the elements. The walls and surfaces may be connected together by bolting, welding, gluing, or by any means known. The four vertical walls are preferably connected orthogonally in a general x-shape along, around, or about a vertical axis 20 to maximize the volume of the hydro-pneumatic chambers 12 and 14 and the strength of the structure as a whole. Various sized walls 21-24, 36, and 38, as well as various angles of incidence between these walls, are within the contemplation of the invention.

In an exemplary embodiment, the opening and closing of the water gates is synchronized by shafts 40 and 41. FIGS. 1-4 illustrate a complete operation cycle of the system. A first set of water gates 31 and 33 is defined and connected by a first common shaft 40. Similarly, a second set of water gates 32 and 34 is defined and connected by a second common shaft 41 which crosses the first shaft 40. As seen in FIGS. 1 and 2, the use of common shafts 40 and 41 permits synchronization of the alternating opening and closing of the sets of water gates 31/33 and 32/34. The water gates are synchronized such that water gates 32/34 located on opposite sides of the walls 21 and 23 may be in open position while the other water gates 31/33 are closed. In this condition, water flows into a first hydro-pneumatic chamber 12 through the inlet port 27, while water flows out of the second pneumatic chamber 14 through an egress port 29.

Figure 4:
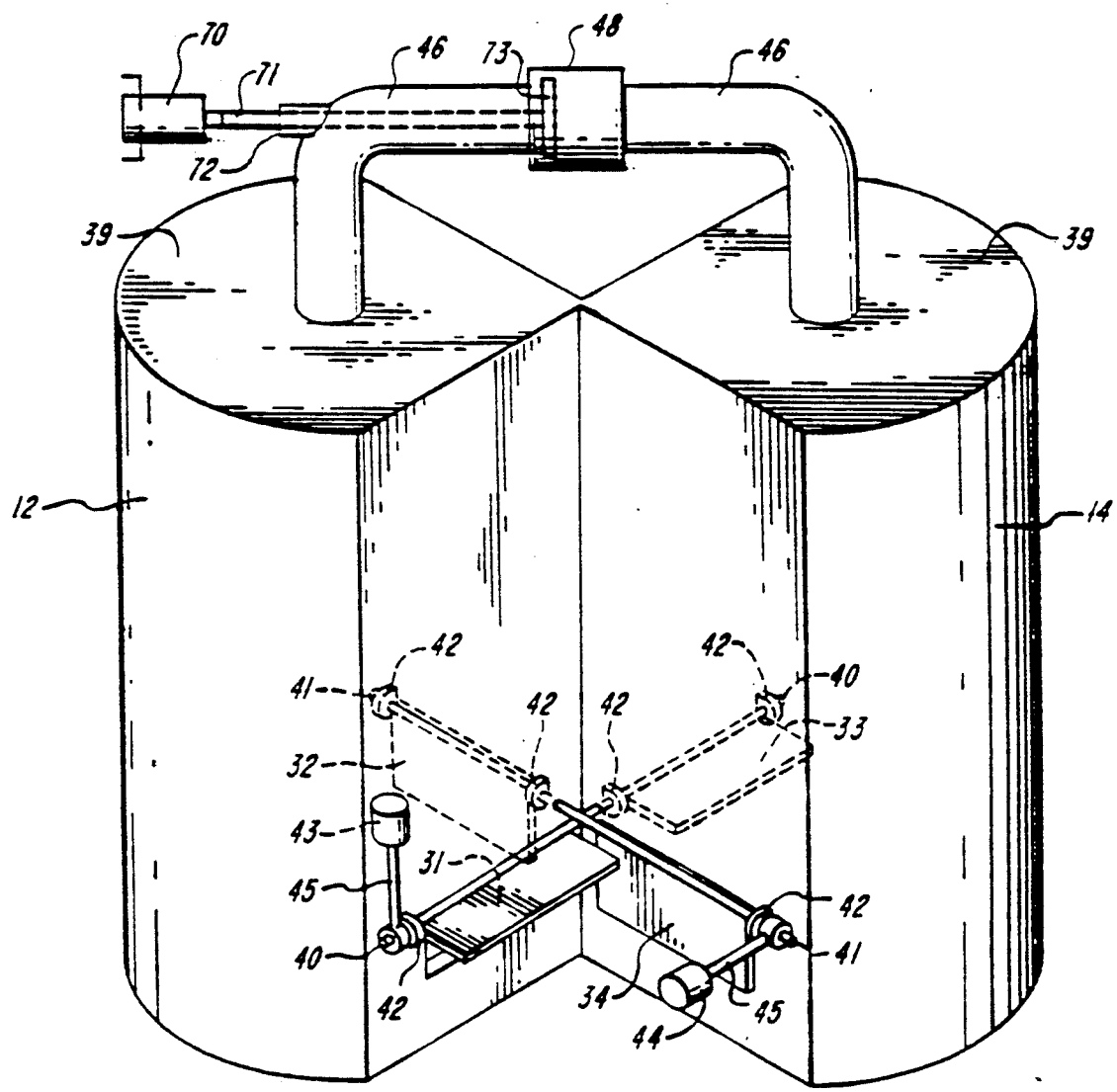
FIG. 4 is a perspective view of the gates of FIG. 1 and the hydro-pneumatic chambers having a pipe and air-turbine.

When the water level in the first chamber 12 equals the higher water level 16 and the water level in the second chamber 14 equals that of the lower water level 18, the second phase of operation, as shown in FIGS. 3-4, may begin. Consequently, the set of water gates 32/34 are closed by a counterweight 44 attached to the common shaft 41, and the other set of water gates 31/33 are permitted to open by the natural force of the water level differential; thus, as shown in FIG. 3, water flows into the second hydro-pneumatic chamber 14 through the inlet port 28, while water flows out of the first hydro-pneumatic chamber 12 through egress port 26. When the water level in the second chamber 14 equals that of the higher water level 16, and the water level in the first chamber 12 equals that of the lower water level 18, the water gates 31/34 are closed by a counterweight 43 attached on the shaft 40. Water gates 32/34 are then permitted to open by the natural force of the water level differential and the cycle is repeated.

Figure 5:
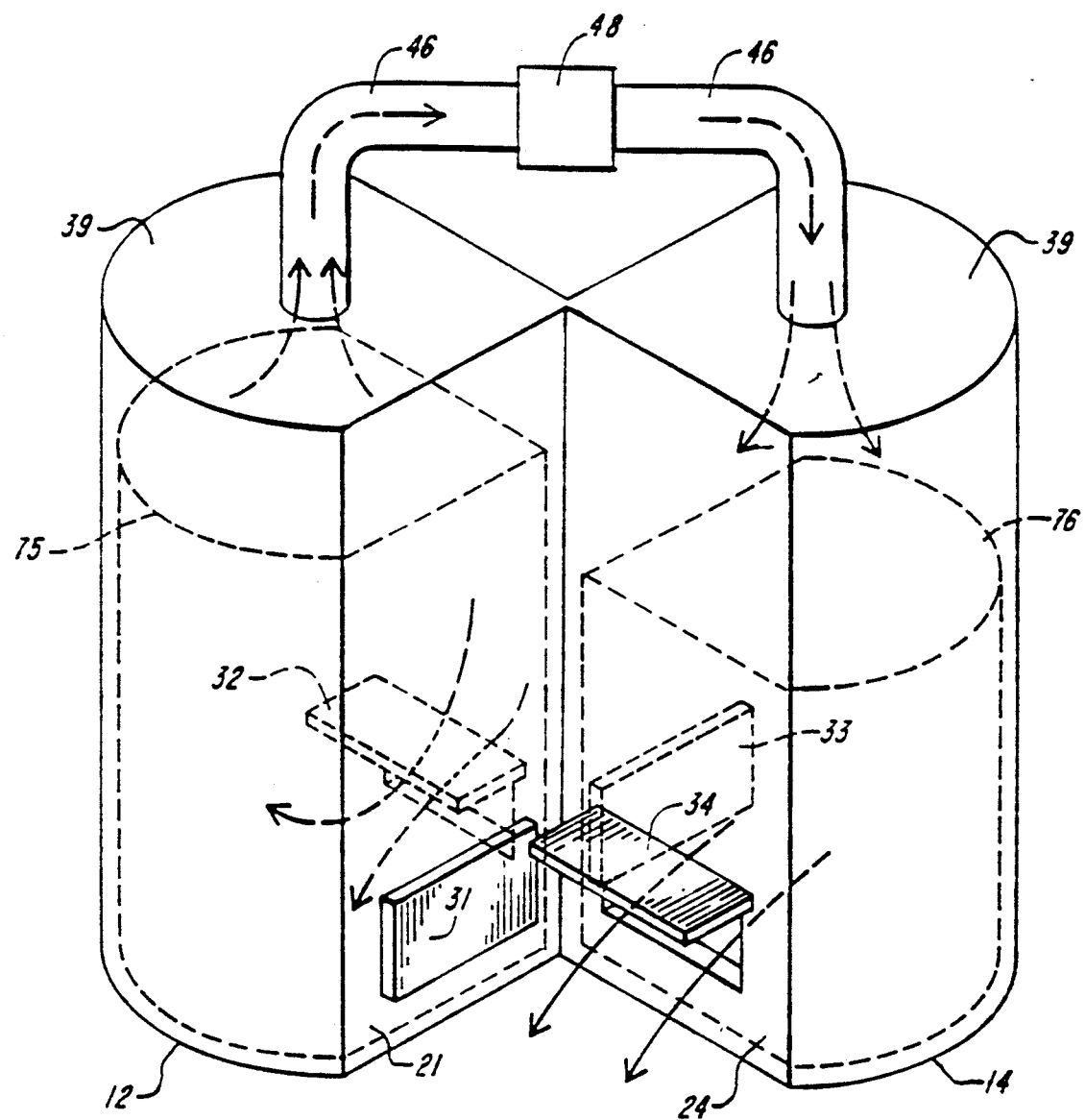
FIGS. 5 and 6 are perspective diagrammatic views of the hydro-pneumatic chambers and water levels therein.
Figure 6:
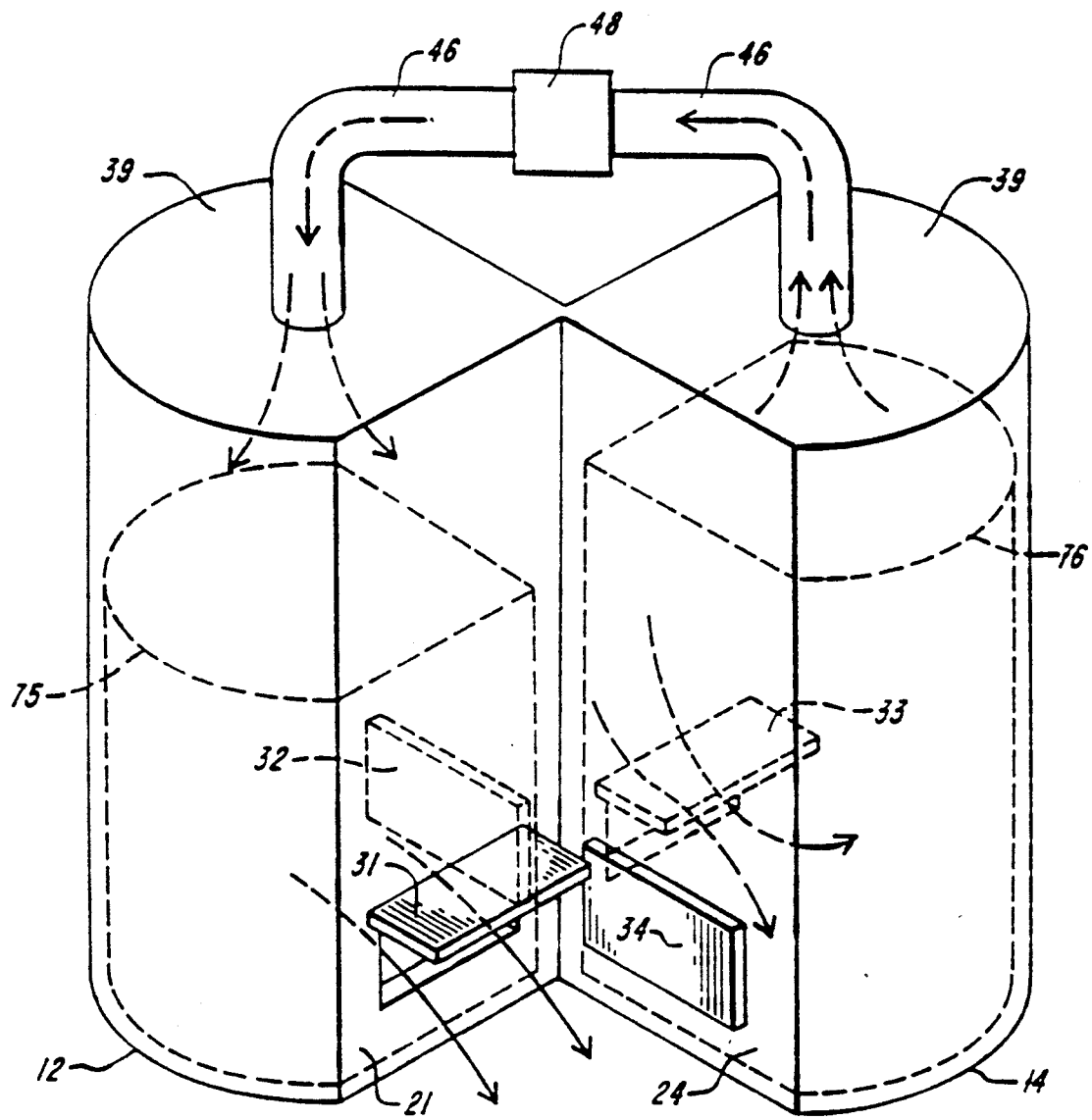

As a result of the cross-synchronized operation of the water gates 31/33 and 32/34, the water level in one of the two hydro-pneumatic chambers rises, while the water level in the other chamber falls. This is illustrated in FIGS. 5 and 6. While air pressure is built up in the first hydro-pneumatic chamber 12 by the water level rising 75 therein, a partial vacuum is created in the second hydro-pneumatic chamber 14 by the water level falling 76 therein, as shown in FIG. 5. After the opened gates are closed and closed gates are opened, the water level 75 in the first chamber 12 falls and creates a partial vacuum, while the water level 76 in the second chamber 14 rises and builds pressure, as shown in FIG. 6. A pipe, tube, or channel 46 which connects the hydro-pneumatic chambers 12 and 14 permits air to move back and forth between the chambers 12 and 14.

The air jet movement is essentially doubled by the pressure generated in one chamber and the vacuum created in the other, and the energy of this air jet can be harnessed by an air turbine 48 which, as shown in FIG. 4, may comprise an electrical generator 70 connected by a shaft 71 to a rotor 73 located within the pipe 46. The electrical generator 70 is located outside of the pipe 46 by the shaft 71 which is surrounded by an air tight seal 72 at the pipe surface. A Wells type rotor is a good example of the kind of turbine equipment which may be employed because it rotates in one direction even in a reversing air flow.

The use of the two chambers in the present invention has an advantage over prior art designs in which only one chamber is used because the air jet which is harnessed by the pipe/turbine 46/48 is effectively doubled. In addition to the air turbine, a piston-and-pushrod or other device may be used to harness the energy of the air jet within the pipe or channel 46.

The common shafts 40 and 41 which connect the opposing sets of water gates are preferably of tubular cross-sectional shape and comprised of strong material such as steel, aluminum, plastic or other desirable materials. The shafts may be solid or hollow, depending upon the strength needed to withstand the force of water pressure on the water gate. Water-proof bearings 42 permit the shafts to be rotatably mounted through or to the vertical walls 2 and 24 or upon holding structures (such as shown at 25 in FIGS. 1 and 3) attached or integrally molded to the vertical walls 21 and 24. A variety of known water-proof bearings can be used for this purpose.

Figure 7:
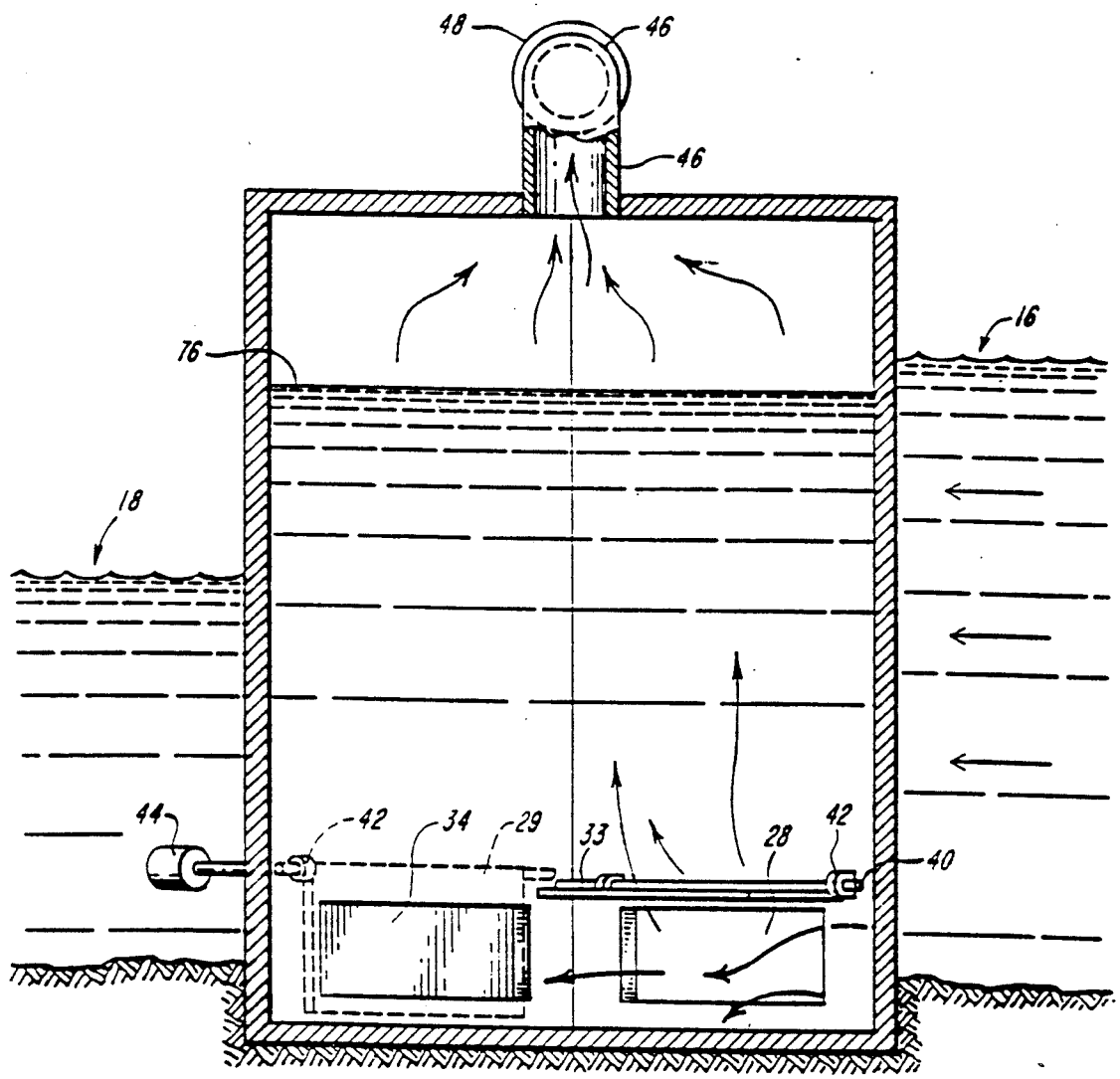
FIG. 7 is a sectional view along direction A of FIG. 3.

FIG. 7 is a partial sectional view of the system shown along direction A of FIG. 3. The water level 76 within the second hydro-pneumatic chamber 14 rises towards the upper water level 16 as water flows inward through the ingress port 28. The corresponding water gate 33 is in an open position. The water in the chamber 14 is prevented from flowing out through the egress port 29 by the water gate 34. The air compressed by the rising water level rushes up through the tube or passageway 46 connected at or near the top of the chamber 14 and through the air turbine 48.

Figure 8:
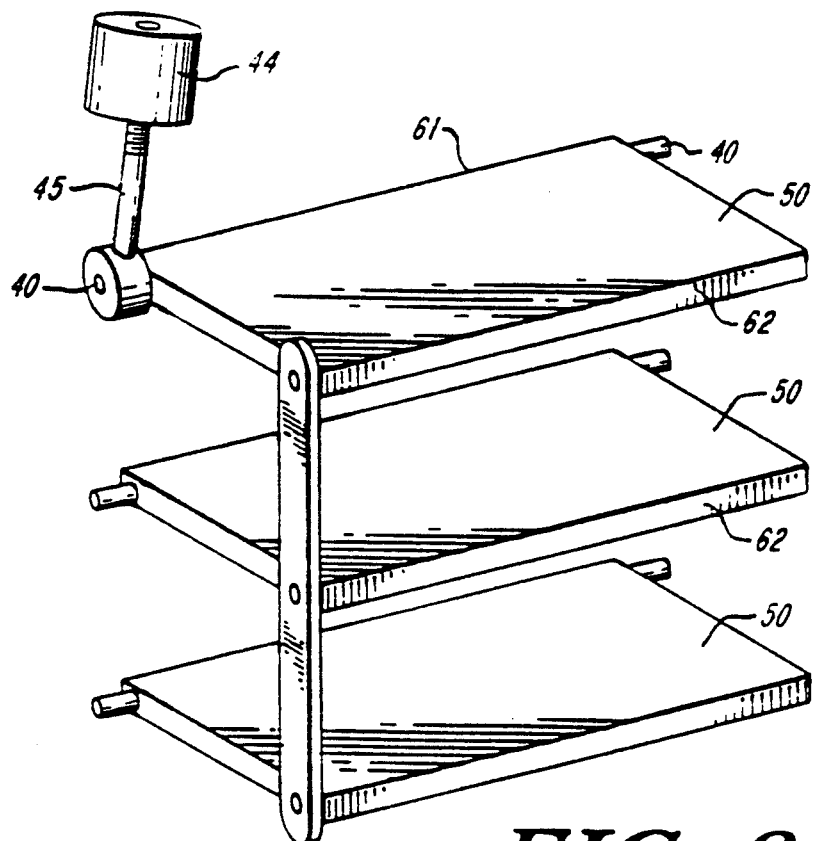
FIG. 8 is a perspective view of a water gate comprised of a plurality of ganged louvers.

In another exemplary embodiment shown in FIG. 8, each water gate may comprise a plurality of slats or louvers 50 in a gallows arrangement operative for simultaneous opening and closing of the water ports. The louvers 50 may be ganged by a vertical rod 52. Thus, the plurality of louvers 50 which comprise the water gate 31 may be simultaneously connected and moveable by means of a vertical rod 52 hinged to the outer edge of the louvers 50. As in the embodiments described above, the counter weight 44 (also 43) is preferably attached orthogonally to the plane of the water gate louver 50 so that when the louver 50 is in open position, the counter weight 44 has minimal moment. The cumulative weight of the water gate louvers 50, as well as the weight of the counter weight 44/43 and the distance the counter weight is mounted from the shaft 40 (also 41), depends upon the volume of water expected to flow into and out of the chambers.

The plurality of louvers 50 may be connected by cables or by any other means known. If the louvers are connected to the common shafts (40/41) or other shafts at a point below their upper edge 61, cables can be used to link all lower edges 62 together and all upper edges 61 together, so that the louvers can be opened and closed at the same time.

Figure 9:
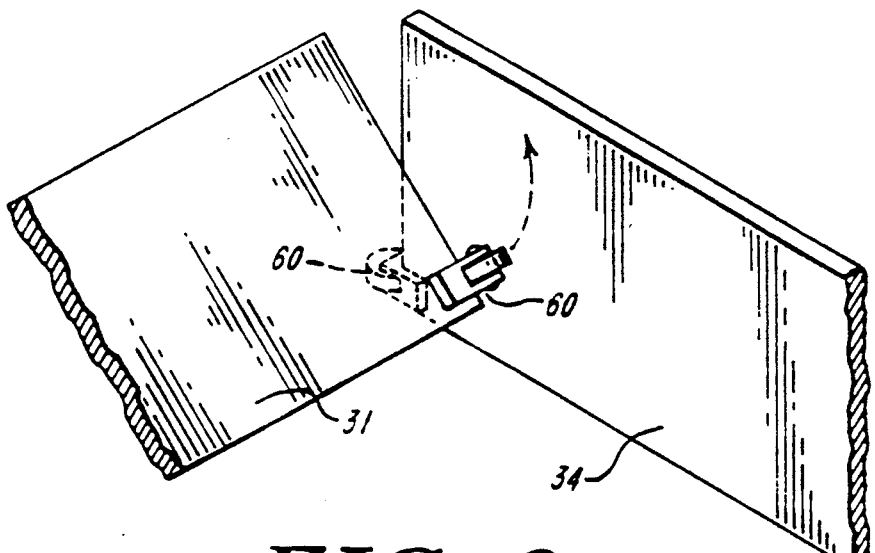
FIG. 9 is a partial illustration of wheels mounted on open and closed water gates.

FIG. 9 is an enlarged view of wheel or roller mechanisms 60 which may be attached to water gates 31 and 34 to facilitate the opening of one set of gates and the preventing of the other set of gates from opening. The rollers 60 may be made of plastic, metal, or other materials which are relatively resistant to the corrosive effects of water.

Figure 10:
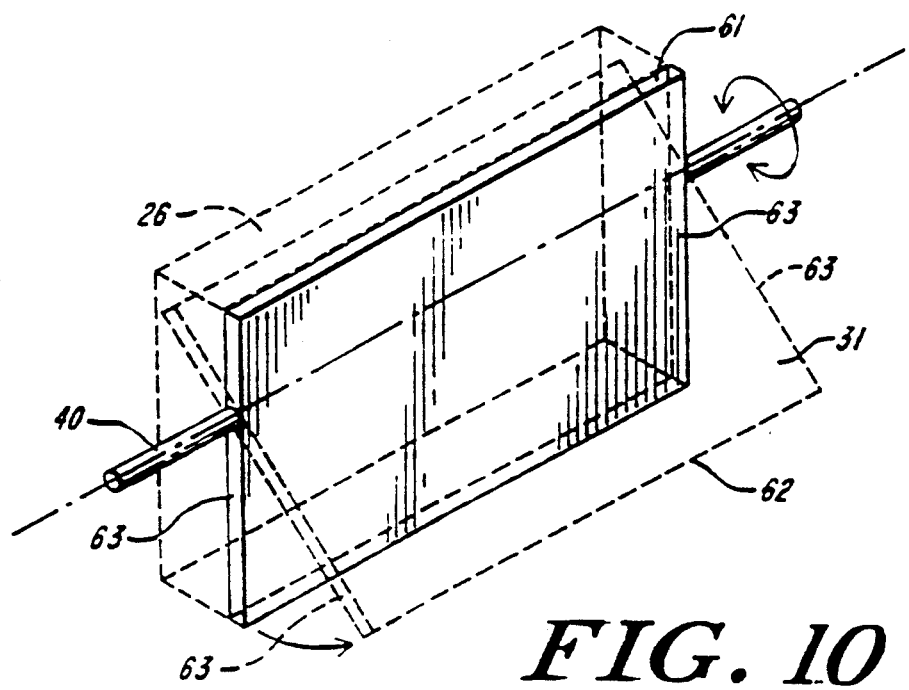
FIG. 10 is an illustration of an exemplary embodiment of a water gate louver.

FIG. 10 shows an exemplary embodiment of the invention wherein the water gate 31, which has a top edge 61, bottom edge 62, and side edges 63, is mounted so as to decrease the force needed to turn the shaft 40. The water gate louver 50 is hinged along a horizontal axis below the top edge 61 to permit the top edge to be rotated in a direction opposite to the bottom edge 62. Thus, high water pressure can be managed by mounting louvers slightly above their midpoints on the shafts; in this way, the water gate louvers become easier to close and less inclined to open until the requisite water pressure is achieved on the upstream side of the water gates. FIG. 10 further illustrates that the water gate 31 may be sized to fit flush within the dimensions of the port 26 in which it is disposed.

Figure 11:
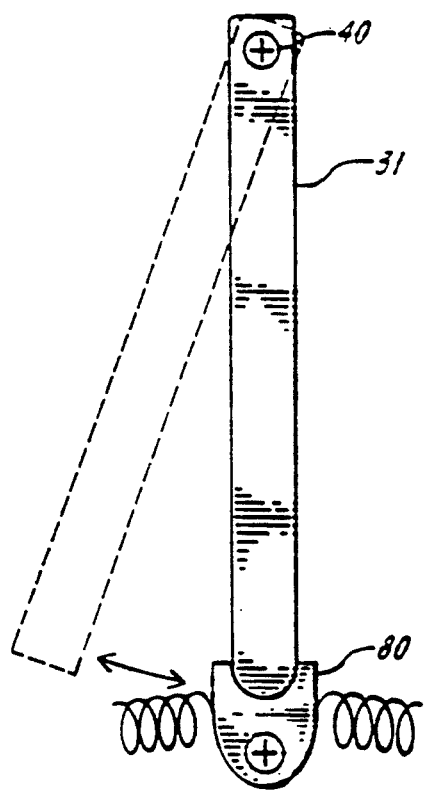
FIG. 11 is a side view of an automatic gate locking mechanism.

In a further exemplary embodiment of the invention, as shown in FIG. 11, the closing of the water gates is achieved by virtue of their own weight, and opening of the gates is provided by the water pressure on a gate 31 having a latch, lock, or other device 80 which unlocks at a predetermined point such as when a certain water level or pressure is reached in one of the chambers. A variety of latching mechanisms can be used. For example, the latch 80 may be comprised of a U-shaped member which is rotatable about an axis parallel to the shaft 40 upon which the gate 31 is mounted. The member may be spring-loaded to snap the engaged gate 31 shut or open. Another example of a control locking system is described in U.S. Pat. No. 4,464,080 at Col. 9, line 14 through Col. 10, line 10, and in FIGS. 11A and 11B therein.

Figure 12:
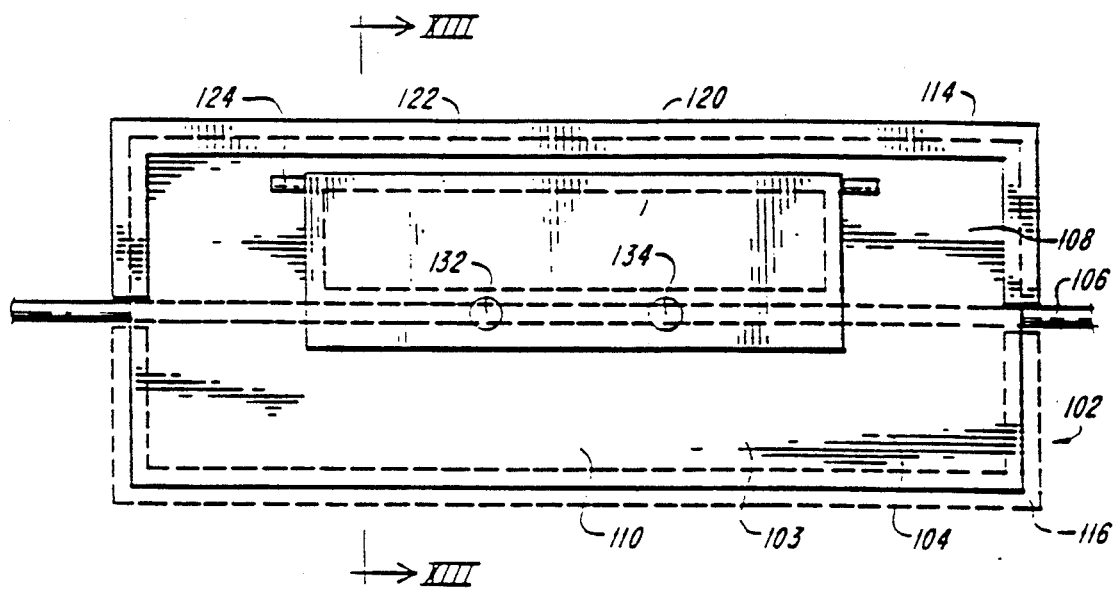
FIG. 12 is a front view of a further embodiment of a water gate according to the invention.

A further embodiment of a water gate of the present invention is shown in FIGS. 12 through 15. FIG. 12 shows the gate 102 which opens and closes a port 103 located in a wall 105 of a water power harnessing system. The gate 102 of this embodiment may be used as the ingress or egress gate in the two-chambered system described above. It will also be appreciated that the gate of this embodiment may be used in other suitable water power harnessing systems.

Figure 15:
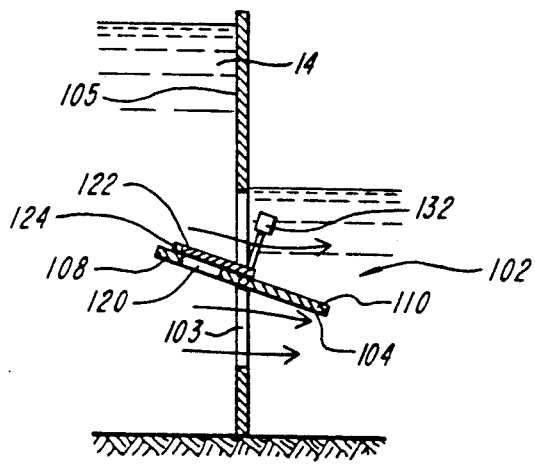
FIG. 15 is a cross-sectional view of the water gate of FIG. 13 in a still further stage of operation.

FIG. 12 shows the gate 102 in the closed position. The gate comprises a door 104 pivotally mounted to the vertical wall 105 by a hinge pin 106 for rotation about a horizontal axis. The door is mounted to fit within the opening of the port 103 and flush with the wall 105. The rotational axis is located in the vertical midsection of the door 104, so that when door 104 opens, an upper portion 108 of door 104 extends into the upstream flow and a lower portion 110 of the door 104 extends into the downstream flow of the water, as shown in FIG. 15. Preferably, the rotational axis is located at the vertical midpoint as shown in FIG. 12. Although a hinge pin mounted within the port is shown, any suitable mechanism to provide the rotational motion of the door 104 may be provided.

As shown in FIG. 12, seal plates 114 and 116 are provided on the edges of the port 103. The seal plate 114 is provided on the downstream side of the wall 105 and the seal plate 116 is provided on the upstream side of the wall 105. The door 104 abuts the seal plates 114 and 116 when the door is in the closed position. The seal plates act as a stop for the door by preventing the door from overrotating. Also, the seal plates prevent water from leaking downstream when the door is closed. Other suitable sealing and stopping mechanisms, such as a rubber gasket, may be provided.

A window 120 is provided in the upper portion 108 of the door 104. A shutter 122 is pivotally mounted adjacent to the window 120 by a hinge pin 124. In the closed position, the shutter closes the window 120 and prevents water from flowing therethrough. The shutter is shown overlying the edges of the window. However, the shutter could be sized to fit flush within the window in the closed position if desired. Suitable sealing members and/or stop members may be provided.

Counterweights 132, 134 are mounted on the shutter 122. The counterweights operate as a gravitational lock to close the shutter and the door in the manner to be described below. Because the counterweights 132, 134 are mounted on the shutter 122 which overlies the reduced area of the window 120 rather than the entire port 103, the counterweights 132, 134 may be of a lesser weight than prior art counterweights provided to close the entire door. Although two counterweights are shown in FIG. 12, one or any other suitable number of counterweights may be provided.

Figure 13:
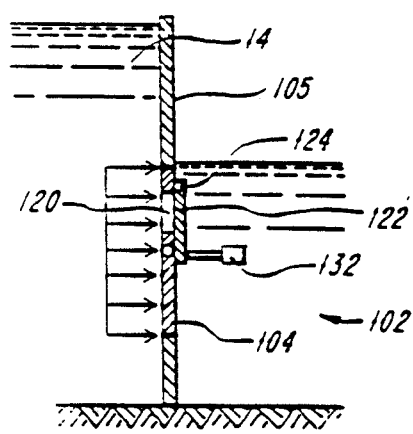
FIG. 13 is a cross-sectional view along line XIII—XIII of FIG. 12 of the water gate in one stage of operation.
Figure 14:
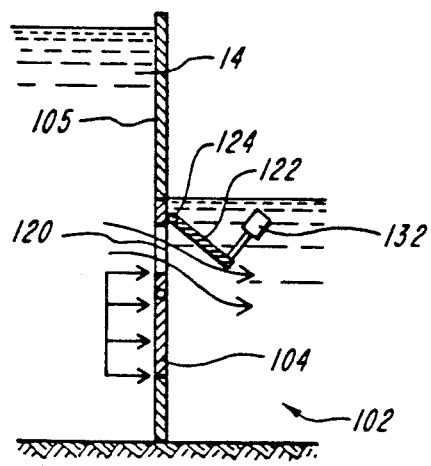
FIG. 14 is a cross-sectional view of the water gate of FIG. 13 in a further stage of operation.

In operation, the counterweights 132, 134 provide a constant pressure on the door 104 which tends to keep the door closed (see FIG. 13). When the water level upstream reaches a high water level such that the magnitude of the pressure due to the water head overcomes the magnitude of the pressure on the door from the counterweights, the gate begins to open. The gate opens in the following manner. As shown in FIG. 14, the shutter 122 opens first and water begins to flow downstream through the window 120. As shown in FIG. 14, since the window 120 is open, the pressure is no longer exerted on the upper part of the door over the area of the window 120. The door 104 then begins to open under the water pressure on the bottom part of the door. Due to the reduced drag force on the door 104 from the water flowing through the window 120, the door 104 is able to rotate more rapidly than a solid gate. The door 104 opens as shown in FIG. 15. When the door 104 is open, the counterweights 132 and 134 operate to force the shutter 122 against the door 104, closing the window 120. The counterweights are placed substantially adjacent the vertical center of the door 104, as shown in FIGS. 12 and 15. In this manner, the counterweights act to close the entire door 104 in addition to the shutter 122 when the water levels even out.

The water gate of the present invention thus provides a more rapid opening and closing cycle. The gravity closure may be formed with counterweights of a lesser weight than in prior art systems. The simplicity of the water gate eliminates the need for a supplementary motor drive. When, for example, the water gate of this embodiment comprises the ingress and egress gates in a system such as the two-chambered system described above, the water/air power converter may be operated more efficiently and smaller chambers may be used to achieve the same water flow rate as with solid gates.

Figure 17:
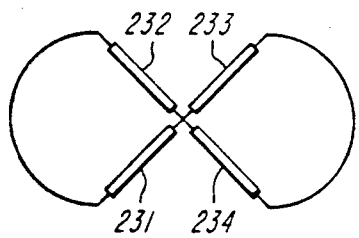
FIG. 17 is a cross-sectional view along line XVII—XVII of FIG. 16.
Figure 18:
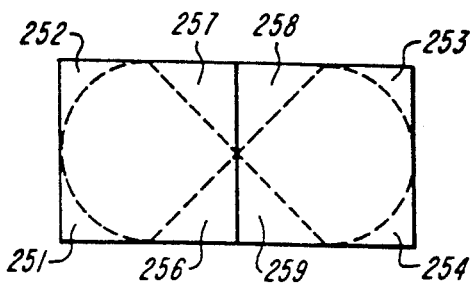
FIG. 18 is a cross-sectional line XVIII—XVIII of FIG. 16.
Figure 16:
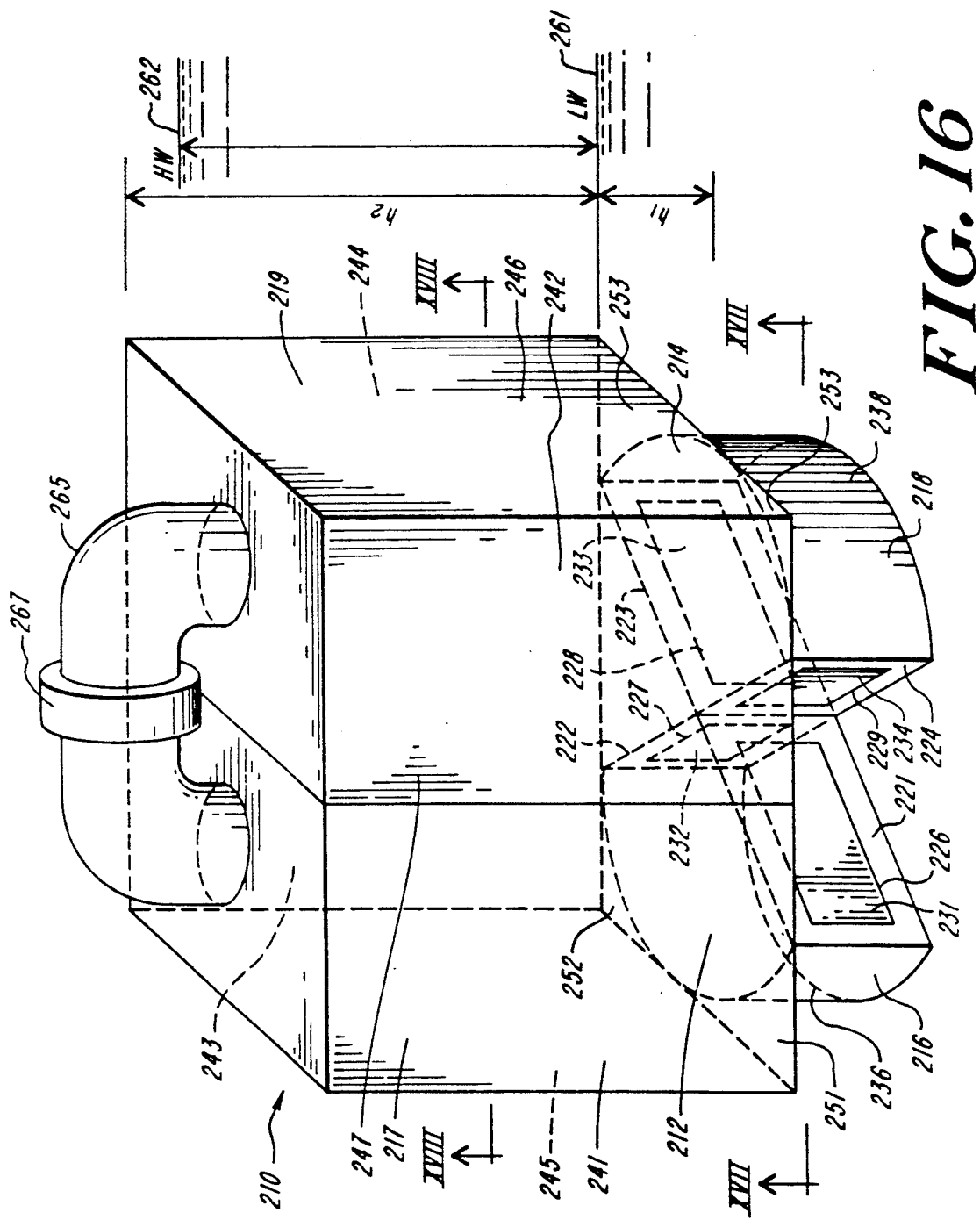
FIG. 16 is a perspective view of a further embodiment of the chambers.

A further embodiment of the hydro-pneumatic chambers is shown in FIGS. 16 through 18. In this embodiment, the system, shown generally at 210, comprises a first hydro-pneumatic chamber 212 and a second hydro-pneumatic chamber 214. Each chamber comprises a lower portion 216, 218 and an upper portion 217, 219.

The lower portions 216, 218 are formed with vertical walls 221, 222, 223, 224. The walls intersect at right angles along a vertical axis. Ingress ports 227, 228 are formed in the walls 222, 223. Egress ports 226, 229 are formed in the walls 221, 224. Water gates 231, 232, 233, 234 are associated with the ports 226, 227, 228, 229 respectively. The water gates may suitably be configured according to any of the embodiments disclosed above.

The lower portions 216, 218 of each chamber include a further vertical wall 236, 238 connecting the vertical walls 221, 222 and 223, 224 respectively. The vertical walls 236, 238 are curved to form portions of a cylindrical wall. In this manner, the lower portion of each chamber is configured as a portion of a cylinder.

The upper portion 217, 219 of each chamber is formed with a rectangular configuration from downstream walls 241, 242 and upstream walls 243, 244. Side walls 245, 246 interconnect the downstream and upstream walls 241, 243 and 242, 245 respectively. Center wall 247 also interconnects the downstream and upstream walls 241, 243 and 242, 245 along midpoints thereof. The center wall 247 is disposed vertically aligned along the vertical axis at the interconnection of the walls 221 through 224 of the lower portions 216, 218 of the chambers. Floor portions 251, 252, 253, 254, 256, 257, 259 close off the bottom of the upper portions extending beyond the cylindrical lower portion. A ceiling portion 255 connects to the downstream walls 241–244, side walls 245, 246, and center wall 247 to enclose the air space above the water surface in each of the chambers 212, 214, as described above in connection with chambers 12 and 14.

A pipe, tube, or channel 265 interconnects each chamber 212 and 214 through openings in the ceiling portion 255 to permit air to move back and forth between the chambers. A turbine 267 in the channel 265 permits the energy in the air jet to be harnessed, as described above.

The height $h_1$ of the lower portions 216, 218 are preferably no greater than the low water level LW shown schematically at 261 in FIG. 16. The height $h_2$ of the upper portions 217, 219 is generally significantly greater than the height $h_1$ of the lower portions. The upper portions extend above the high water level HW, shown schematically 262 in FIG. 16.

The cylindrical configuration of the lower portions 216, 218 reduces hydraulic losses due to vortices during water inflow and outflow. The rectangular configuration of the upper portions 217, 219 provides an increase in the volume of the air and water held in the entire system, leading to greater air and water flow. Air flow within the sharp corners of the rectangular configuration does not generate significant vortices as water flow does, and thus, energy losses are not a disadvantage. Additionally, a rectangular configuration is more simple to construct. The optimal configuration is as shown in FIG. 18, in which the cylindrical walls 236, 238 are circumscribed by the walls 241–246 of the upper portions.

As it will be known to those skilled in the art that modifications of the invention can be practiced within the spirit of the invention, the scope of the invention is limited only by the scope of the claims.

I claim:

1. A water gate for opening and closing a port on a hydrodynamic system for harnessing energy from a water level differential, the water gate comprising:
   a door hingedly mounted within the port for rotation about a first horizontal axis;
   a window disposed in the door above the first horizontal axis; and
   a shutter mounted to the door for rotation about a second horizontal axis to open and close the window, whereby the shutter is operative under water pressure to rotate to an open position before the door is caused to rotate to an open position by the water pressure.

2. The water gate of claim 1, wherein the shutter is mounted on the outside of the door to overlie the edges of the window.

3. The water gate of claim 1, wherein the shutter is sized to cover the window when the gate is in the closed position.

4. The water gate of claim 1, further comprising a gravitationally actuated closure mounted on the shutter.

5. The water gate of claim 4, wherein the gravitationally actuated closure comprises a counterweight disposed on a lower edge of the shutter.

6. The water gate of claim 5, wherein the counterweight is disposed in a horizontal plane defined by the first horizontal axis when the door is in a closed position.

7. The water gate of claim 1, further comprising a counterweight mounted on the downstream side of the shutter.

8. The water gate of claim 1, wherein the door is mounted to fit within the port when the door is in the closed position.

9. The water gate of claim 1, further comprising a seal member disposed to cover the joint between the door and the port when the door is in the closed position.

10. The water gate of claim further comprising a stop member to prevent the door from overrotating.

11. The water gate of claim 1, wherein the first horizontal axis is located in a vertical midsection of the port.

12. The water gate of claim 1, wherein the first horizontal axis is located substantially at the vertical midpoint of the port.

13. The water gate of claim 1, wherein the second horizontal axis is located vertically above the first horizontal axis.

14. The water gate of claim 1, wherein the window is disposed in an upper portion of the door.

15. The water gate of claim 1, wherein the second horizontal axis is disposed above the window.

16. A system for harnessing the energy of current flow or tidal motion of a water body, comprising:
   two hydro-pneumatic chambers each having an inlet port for the ingress of water into the chamber below the water surface and an outlet port for the egress of water out of the chamber below the water surface;
   a water gate disposed at each of the ports and movable between open and closed positions in response to a water level differential on opposite sides of the gate, each water gate comprising:
      a door hingedly mounted within the port for rotation about a first horizontal axis at a vertical midsection of the port,
      each door having a window in an upper portion of the door, and
      a shutter mounted on the door for rotation about a second horizontal axis to open and close the window;
   a linkage between the inlet port water gate of each one of the chambers and the outlet port water gate of the other of the chambers such that an inlet and its linked outlet are either both opened or both closed simultaneously for alternately synchronized operation of the inlet and outlet water gates of each chamber;
   a channel connecting the chamber above the water surface and operative to permit air to move between the chambers in response to a change in water level in the chambers; and
   means for harnessing the energy of the air moving within the channel.

17. The system of claim 16, wherein the second horizontal axis of the shutter is located above the window.

18. The system of claim 16, further comprising a gravitationally actuated closure on the shutter.

19. The system of claim 18, wherein the gravitationally actuated closure comprises a counterweight disposed on a lower edge of the shutter.

20. The system of claim 19, wherein the counterweight is horizontally aligned with the first horizontal axis when the door is in the closed position.

21. The system of claim 16, wherein the door is mounted to fit within the port when the door is in the closed position.

22. The system of claim 16, wherein the first horizontal axis extends through substantially the vertical midpoint of the door and the vertical midpoint of the port.

23. The system of claim 16, further comprising a seal member disposed to cover the joint between the door and the port when the door is in the closed position.

24. The system of claim 16, further comprising a stop member to prevent the door from overrotating.

25. The system of claim 16, wherein the door is mounted within the port such that an upper portion rotates into the upstream flow and a lower portion rotates into the downstream flow of the water in response to water pressure.

26. The system of claim 16, wherein the hydro-pneumatic chambers are defined and separated by four vertical walls, the inlet ports disposed in two of the vertical walls, and the outlet ports disposed in the other two of the vertical walls.

27. The system of claim 26, wherein each of the hydro-pneumatic chambers further comprise a wall connected to one of the walls containing an outlet port and one of the walls containing an inlet port and a top portion operative to enclose the space within the walls above the surface of the water within each of the chambers.

28. The system of claim 16, wherein the ports are rectangular in shape.

29. The system of claim 16, wherein the means for harnessing the energy of the air moving within the channel comprises an air turbine.

30. A water gate for opening and closing a water port in a system for harnessing energy from a water level differential, the water gate comprising:
   a door rotatably mounted within the port between a closed position, wherein the door is disposed vertically, and an open position, wherein an upper portion of the door extends upstream and a lower portion of the door extends downstream;
   a window disposed in the upper portion of the door;
   a shutter pivotably mounted to open and close the window; and
   a counterweight mounted to the downstream side of the shutter.

31. The water gate of claim 30, wherein the counterweight is mounted to extend into the downstream flow when the door is in the open position.

32. The water gate of claim 30, wherein the counterweight is mounted on a lower edge of the shutter.

33. The water gate of claim 30, wherein the counterweight is mounted on the shutter to lie in a horizontal plane defined by the rotation axis of the door when the shutter and the door are in their respective closed positions.

34. The water gate of claim 30, wherein the counterweight is mounted to close the door when the upstream and downstream water levels even out.

35. A system for harnessing the energy of tidal movement or current flow in a water body separated into a higher water level and a lower water level, comprising:
   a lower portion comprising:
      four vertical walls connected about a vertical axis, each containing a port below the water surface operative to permit passage of water;
      a water gate corresponding to each of said ports, each said water gate moveable between open and closed positions;
      two curved walls, each curved wall interconnecting a pair of adjacent walls of the four vertical walls to define a pair of lower chambers each configured as a portion of a cylinder; and
      a linkage between pairs of the water gates, one gate of each pair exposed to the higher water level and the other gate exposed to the lower water level, such that the opening and closing of each pair is alternately synchronized with the other pair to alternately allow water to enter one lower chamber while it exits the other lower chamber;
   an upper portion comprising:
      a pair of rectangularly configured upper chambers, each rectangular upper chamber vertically disposed above and in continuous spatial communication with a respective one of the cylindrical lower chambers of the lower portion to form a pair of air/water chambers;
      a channel connecting the pair of air/water chambers, the channel operative to permit the movement of air between the pair of air/water chambers in response to a change in water level in the chambers; and
      means for converting the movement of air in the channel into usable energy.

36. The energy system of claim 35, wherein the upper portion further comprises a vertical wall separating the pair of upper chambers, the vertical wall disposed vertically aligned with the vertical axis of the lower portion.

37. The energy system of claim 35, wherein the curved walls of the lower portion are circumscribed within the walls of the upper portion.

38. The energy system of claim 35, wherein the volume of the upper portion is greater than the volume of the lower portion.

39. A system for harnessing the energy of current flow or tidal motion of a water body, comprising:
   two hydro-pneumatic chambers each having an upper portion of generally rectangular configuration and a lower portion having a configuration of a portion of a cylinder, the lower portion having an inlet port for the ingress of water into the chamber below the water surface and an outlet port for the egress of water out of the chamber below the water surface, the upper portion having a greater volume than the lower portion;
   a water gate disposed at each of said ports and rotatable between open and closed portions along a horizontal axis in response to a water level differential on opposite sides of the gate;
   a linkage between the inlet port water gate of each one of the chambers and the outlet port water gate of the other of the chambers such that an inlet and its linked outlet are either both opened or both closed simultaneously for alternately synchronized operation of the inlet and outlet water gates of each chamber;
   a channel connecting said chambers above the water surface and operative to permit air to move between said chambers in response to a change in water level in the chambers; and
   means for harnessing the energy of the air moving within said channel.

40. The system of claim 39, wherein the vertical height of the upper portion is greater than the vertical height of the lower portion.

41. The system of claim 39, wherein the horizontal cross-sectional area of the upper portion is greater than the horizontal cross-sectional area of the lower portion.

* * * * *

UNITED STATES PATENT AND TRADEMARK OFFICE
CERTIFICATE OF CORRECTION

PATENT NO. : 5,222,833
DATED : June 29, 1993
INVENTOR(S) : Alexander M. Gorlov

It is certified that error appears in the above-identified patent and that said Letters Patent is hereby corrected as shown below:

In the Abstract, line 11, "counter", should read -- counter- --.

On title page, item [54] and col. 1, title should read as follows:

--GRAVITATIONAL WINDOW SHUTTER FOR HYDRO-PNEUMATIC CURRENT FLOW HARNESSING SYSTEM--.

Column 7, line 16, "walls 2 and 24" should read --walls 21 and 24--.

Column 10, line 14, "257, 259" should read --257, 258, 259--.

Column 11, line 22, "of claim further" should read --of claim 1, further--.

Signed and Sealed this

Sixteenth Day of August, 1994

Attest:

BRUCE LEHMAN

Attesting Officer

Commissioner of Patents and Trademarks